United States Patent [19]

Lintott

[11] 4,244,010
[45] Jan. 6, 1981

[54] AC ELECTROLYTIC MOTOR START CAPACITOR

[75] Inventor: David A. Lintott, Clinton, Tenn.

[73] Assignee: Sprague Electric Company, North Adams, Mass.

[21] Appl. No.: 961,327

[22] Filed: Nov. 16, 1978

[51] Int. Cl.³ .......................... H01G 9/00; B01J 17/00
[52] U.S. Cl. ...................................... 361/433; 29/570
[58] Field of Search ...................... 361/433, 271, 272; 29/570

[56] References Cited

U.S. PATENT DOCUMENTS

| 4,009,425 | 2/1977 | Muranaka et al. | 361/433 |
| 4,146,916 | 3/1979 | Breeden et al. | 361/433 |
| 4,164,006 | 8/1979 | Kolkowski | 361/433 |

Primary Examiner—Andrew J. James
Attorney, Agent, or Firm—Connolly and Hutz

[57] ABSTRACT

An AC electrolytic motor start capacitor with improved power factor is produced by winding the electrode foils with their leading edges even. A capacitor containing such a wound section has a lower power factor than one not so wound.

6 Claims, 2 Drawing Figures

U.S. Patent      Jan. 6, 1981      4,244,010

AC ELECTROLYTIC MOTOR START CAPACITOR

BACKGROUND OF THE INVENTION

This invention relates to a wound section for an AC capacitor, particularly a motor-start capacitor, in which the anodized electrode foils are wound so that the leading ends are even thus reducing the power factor of a capacitor containing such a wound section.

In order to obtain evenly and smoothly wound sections, it has been customary to start the separator strips and the end of one foil electrode and wind them a few turns to anchor the foil before starting the next foil electrode. Since the first foil and separator strips are under winding tension, they serve to keep the second one in place and assure its even take-up into the wound section. Unfortunately, this arrangement leads to high resistance fringing and a high power factor in AC capacitors.

When the section is being wound for a DC capacitor, it is customary to use a longer cathode strip, and this is the strip started first. Since cathode foil is not anodized, it is less expensive and the additional cathode foil length contributes little to the cost of the capacitor. However, for AC capacitors, both foils are anodized as they alternately serve as anodes, and the additional length of anodized foil used as a lead in for winding does contribute to the cost of the section.

SUMMARY OF THE INVENTION

The principal purpose of this invention is to provide a wound AC motor-start capacitor with an improved power factor while reducing anodized foil requirements.

It has been found possible to wind capacitor sections smoothly with the leading edges even. When this was done, it was discovered that the power factor of an AC capacitor including such a section was reduced. Such even-start winding also reduces the amount of anodized foil required per section.

BRIEF DESCRIPTION OF THE DRAWINGS

FIG. 1 shows a capacitor section being rolled while.

Referring to FIG. 1, spacers 1 and 2, which may be more than single thicknesses, are wound onto a mandrel for a few turns. Electrode foils 3 and 4 are fed in between spacers 1 and 2 with their leading edges even. Winding is continued until the desired size is reached.

In FIG. 2, an even-start, even-finish section has been unrolled showing the two electrodes 3 and 4 of even length separated by longer lengths of spacers 1 and 3, the extra length corresponding to the core and the final few turns on the outside of the section, respectively.

DESCRIPTION OF THE PREFERRED EMBODIMENTS

Figure 1:
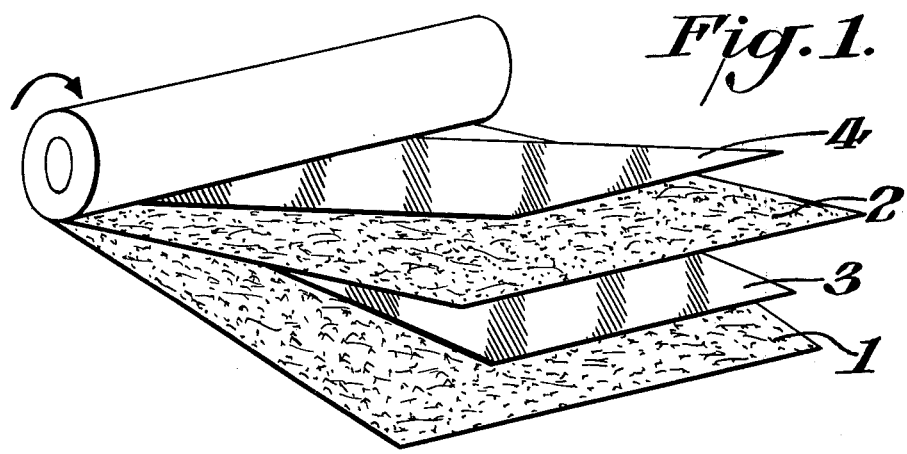
Figure 2:
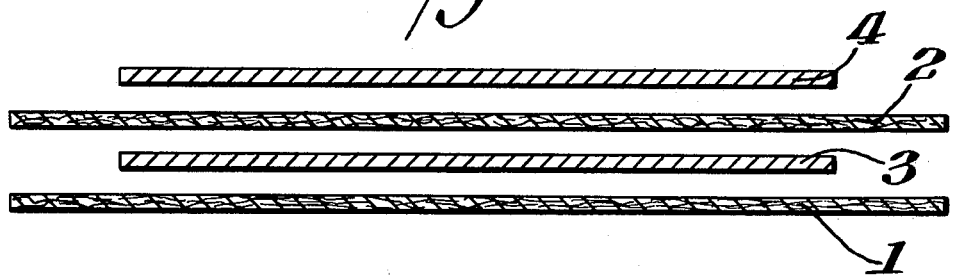
FIG. 2 shows the same section in a completely unrolled condition.

AC electrolytic motor-start capacitor sections are wound with a pair of anodized foil electrodes and interleaved spacers so that the foils do not contact each other when wound. The ends of the foils are started even or substantially even, e.g., within 0.25-in, of each other. Preferably, the foils also finish evenly or substantially evenly, but one foil may be slightly longer than the other to provide up to one extra turn of a single foil at the outside of the roll.

In the example below, even-start 110 V units, impregnated with an ammonium pentaborate—ethylene glycol electrolyte, were tested at 115 VAC, 65° C., and 60 1-sec starts per hour. These units are compared with a competitor's commercial 110 V units.

TABLE I

|  | Amps | Watts | Capacitance $\mu F$ | Power factor, % |
|---|---|---|---|---|
| Even-start unit #1 | | | | |
| 0 hr | 3.90 | 22 | 90.0 | 4.90 |
| 72 hr | 3.95 | 26 | 91.2 | 5.72 |
| 200 hr | 3.90 | 27 | 90.0 | 6.02 |
| 400 hr | 3.95 | 27 | 91.2 | 5.94 |
| Even-start unit #2 | | | | |
| 0 hr | 3.90 | 23 | 90.0 | 5.13 |
| 72 hr | 3.95 | 26 | 91.2 | 5.72 |
| 200 hr | 3.95 | 25 | 91.2 | 5.50 |
| 400 hr | 3.95 | 27 | 91.2 | 5.94 |
| Competitive unit #1 | | | | |
| 0 hr | 4.00 | 36 | 92.3 | 7.83 |
| 72 hr | 3.80 | 37 | 87.7 | 8.47 |
| 200 hr | 3.80 | 39 | 87.7 | 8.92 |
| 400 hr | 3.75 | 39 | 86.5 | 9.04 |
| Competitive unit #2 | | | | |
| 0 hr | 4.20 | 24 | 96.9 | 5.40 |
| 72 hr | 4.05 | 33 | 93.5 | 7.08 |
| 200 hr | 4.00 | 37 | 92.3 | 8.04 |
| 400 hr | 3.95 | 42 | 91.2 | 9.25 |

These results show an improved power factor for the even-start units over competitive commercial units. The units are called even-start even though their ends may be slightly staggered, most preferably not more than 0.25-in, because of either slight slip-page in winding or a deliberate slight offset to prevent a ridge or bulge at the start or finish of a section. Because of the reduction in power factor, this design will permit use of materials otherwise not possible in high-loss capacitors.

What is claimed is:

1. In the manufacture of a wound foil AC electrolytic motor-start capacitor section comprising anodized foil electrode strips and spacer strips wherein the improvement comprises winding said spacer strips on a mandrel for a few turns, then feeding said electrode strips into said winding between said spacer strips with the leading edges of said electrode strips in substantially even alignment, and then continuing to wind the section to the desired size, thereby reducing the power factor of an AC capacitor employing such a section.

2. A process according to claim 1 wherein the outer ends of said electrode foils are also substantially even.

3. A process according to claim 1 wherein one of said foils is longer than the other of said foils and extends beyond the shorter one for up to one turn on the outside of said section.

4. A wound foil AC motor-start capacitor section comprising a pair of anodized foil electrodes separated by spacer strips and wound with the leading ends of said foils in substantially even alignment to reduce the power factor of an AC capacitor employing said section.

5. A section according to claim 4 wherein the outer ends of said foil are substantially even.

6. A section according to claim 4 wherein one of said foils is longer than the other of said foils and extends beyond the shorter one by up to one turn on the outside of said section.

* * * * *